(12) United States Patent  (10) Patent No.: US 6,661,896 B1
Barnett  (45) Date of Patent: Dec. 9, 2003

(54) COMPUTER NETWORK SECURITY SYSTEM AND METHOD

(76) Inventor: Howard S. Barnett, Designs That Compute, 1778 N. Plano Rd., Suite 211B, Richardson, TX (US) 75081

( * ) Notice: Subject to any disclaimer, the term of this patent is extended or adjusted under 35 U.S.C. 154(b) by 0 days.

(21) Appl. No.: 09/223,097

(22) Filed: Dec. 30, 1998

(51) Int. Cl.[7] .................................................. H04L 9/00
(52) U.S. Cl. ........................ 380/262; 380/260; 380/278
(58) Field of Search ................................. 713/160, 162; 380/277, 278, 279, 280, 260, 262

(56) References Cited

U.S. PATENT DOCUMENTS

| | | | | |
|---|---|---|---|---|
| 4,691,355 A | * | 9/1987 | Wirstrom et al. | 713/159 |
| 4,881,263 A | * | 11/1989 | Herbison et al. | 380/21 |
| 5,268,962 A | * | 12/1993 | Abadi et al. | 380/21 |
| 5,303,303 A | * | 4/1994 | White | 380/49 |
| 5,432,850 A | * | 7/1995 | Rothenberg | 380/23 |
| 5,483,596 A | * | 1/1996 | Rosenow et al. | 713/167 |
| 5,673,320 A | * | 9/1997 | Ray et al. | 713/176 |
| 5,724,426 A | * | 3/1998 | Rosenow et al. | 713/167 |
| 5,850,446 A | * | 12/1998 | Berger et al. | 705/79 |
| 6,154,839 A | * | 11/2000 | Arrow et al. | 713/154 |
| 6,490,353 B1 | * | 12/2002 | Tan | 380/37 |

* cited by examiner

Primary Examiner—Gilberto Barron
Assistant Examiner—Douglas J Meislahn
(74) Attorney, Agent, or Firm—W. Thomas Timmons

(57) ABSTRACT

A method and system for maintaining computer network security allows for changeable encryption keys used by each individual work station to be looked up by a server. The server will have numerous logical interfaces corresponding to the active encryption keys, and information is routed through the appropriate interface depending upon which work station is communicating with the server. Each encryption key is encrypted into a transport key for transmission as part of each information packet.

16 Claims, 5 Drawing Sheets

Normal Packet

Encoded Packet

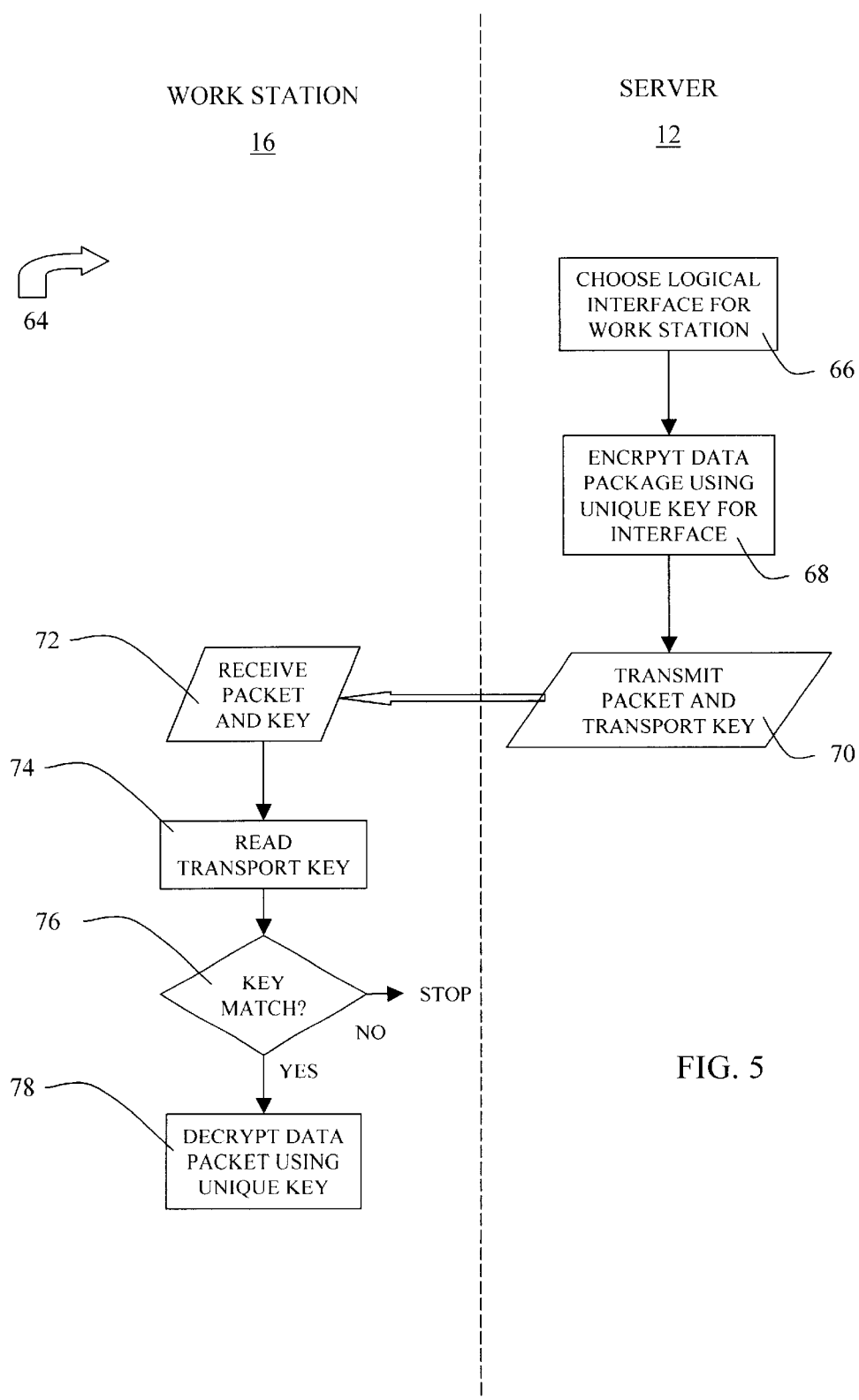

COMPUTER NETWORK SECURITY SYSTEM AND METHOD

BACKGROUND OF THE INVENTION

1. Field of the Invention

The present invention relates generally to computer networks and, in particular, to security for such computer networks.

2. Description of Related Art

With the advent of local area networks (LANs), office computers were able to communicate in a cost efficient manner. As the price of LAN technology has dropped, the use of LANs has increased for such things as shared data bases, electronic mail (E-Mail) and word processing. As LAN technology has grown, the need for LANs to communicate with one another over telephones has also increased. The same type of data that cross LANs also crosses these wide-area networks (WANs) today. Much of this traffic is sensitive information such as business forecasts, sales figures, accounting information, personnel records, new product plans or manpower requirements.

Ethernet has become the dominant physical interface for communication in LANs. Ethernet provides an inexpensive method of connecting many computers on a single wire with a throughput of ten megabits. More than one hundred users can be connected to a server using a single ten megabit channel. All information that is transmitted in that channel can be received by any computer connected to the channel. Almost any computer connected to the channel may be placed in promiscuous mode, allowing it to see any transaction on the Ethernet wire. Promiscuous mode is used normally for diagnostics and for computer bridges. Since software to eavesdrop on the Ethernet line is used for diagnostics and since Ethernet is so prevalent, the software has become increasingly prevalent and sophisticated. The price of some of this software is virtually free since it is available in shareware. These products have also improved their capability to understand what the information crossing the network is trying to do.

For wide-area networks, as well as other LAN topologies, the problem is similar. Anyone who can tap into public switched data communications has access to all the data transferring across the telephone line. Some of the telephone connection portals to a LAN can become access points for promiscuous eavesdropping also. It is conceivable that a person can gain access th rough a remote login facility, and eavesdrop on a network without ever having to log into the network.

SUMMARY OF THE INVENTION

In a preferred embodiment of the present invention, a server contains a data base with information regarding valid keys or encryption algorithms or both which are necessary for encrypting and decrypting data on the network. The term "encryption algorithm" is used here in the broad sense, referring to an algorithm that uses an encryption key to convert a message into a form that is unintelligible without knowledge of the algorithm and the encryption key. The driver level of the server is designed to understand the encryption scheme. During initialization, the driver software reads the encryption information contained in the data base. It configures a logical interface for each record in the data base. As information is passed through the driver, the driver directs the data to one of the logical interfaces.

Work stations are connected by a network medium to the server, but the work stations do not contain an encryption key. When a user initializes a work station, the user enters a key. This key is then used in subsequent transactions with the server.

Any application programs run in the server deal with the data in an unencrypted form. When a server application wishes to talk to a client, in this case a work station, it responds on the same logical interface from which it received the data. This allows the driver to encrypt the data in a manner necessary for that work station to understand. Each work station on the server can have its own key for the encryption algorithm or several work stations may share a key.

A method according to the present invention for secured transmission in a computer network between a work station and a server includes the steps of initializing a predetermined number of logical interfaces in the server, loading a program that takes a character phrase of arbitrary length and generates a unique byte sequence of fixed length called a unique key and a smaller key for transport called a transport key into the work station, installing a software logical interface into the work station defining which encryption algorithm to use, entering a predetermined character phrase into the work station, initializing an encryption algorithm using the character phrase, encrypting the phrase into a unique key and a transport key by the work station logical interface, encrypting, using the unique key, by the work station of a first data packet for transmission, transmitting the encrypted first data packet including the transport key to the server from the work station, receiving the encrypted first data packet by the server, reading the transport key by the server, comparing the transport key with a list of transport keys corresponding to server logical interfaces, and if the transport key matches with a key for a server logical interface, then decrypting by the server of the encrypted first data packet using the unique key and encryption algorithm for that logical interface.

The method, in one embodiment, also includes the steps of encrypting by the server using the logical interface associated with the work station of a second data packet for transmission, transmitting the encrypted second data packet including the transport key to the work station from the server, receiving the encrypted packet of data by the work station, reading the transport key by the work station, comparing the transport key with the transport key of the work station, and if the transport key matches the transport key of the work station, then decrypting by the work station of the encrypted second data package.

The system and method described have been in terms of a server and work stations, but the method can be used in peer-to-peer networks and between servers.

These and other objects, advantages and features of this invention will be apparent from the following description taken with reference to the accompanying drawing, wherein is shown a preferred embodiment of the invention.

BRIEF DESCRIPTION OF THE DRAWING

FIG. 5 is a flow diagram representation of a method for transmitting an encrypted data packet from the server to the work station according to the present invention;

DESCRIPTION OF THE PREFERRED EMBODIMENT

Figure 1:
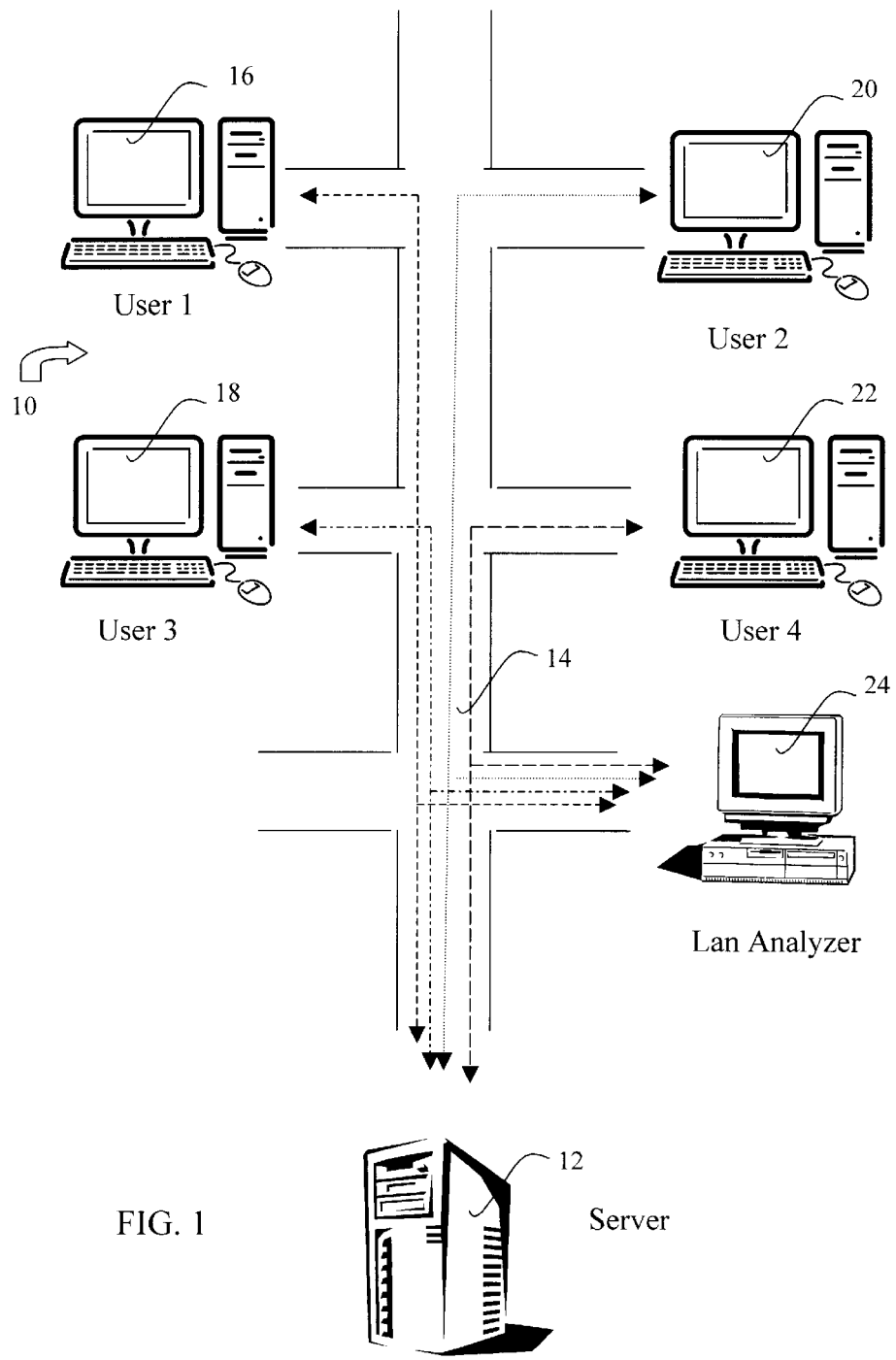
FIG. 1 is a pictorial representation of a local area computer network.

Referring now to the drawing, and in particular to FIG. 1, a computer network according to the present invention is represented generally by reference numeral 10. The particular computer network illustrated is a local area network (LAN) which includes a server 12 connected by a network medium 14 to work stations 16, 18, 20 and 22 and a LAN analyzer 24. Work stations 16, 18, 20 and 22 are, in this arrangement, personal computers.

Figure 2:
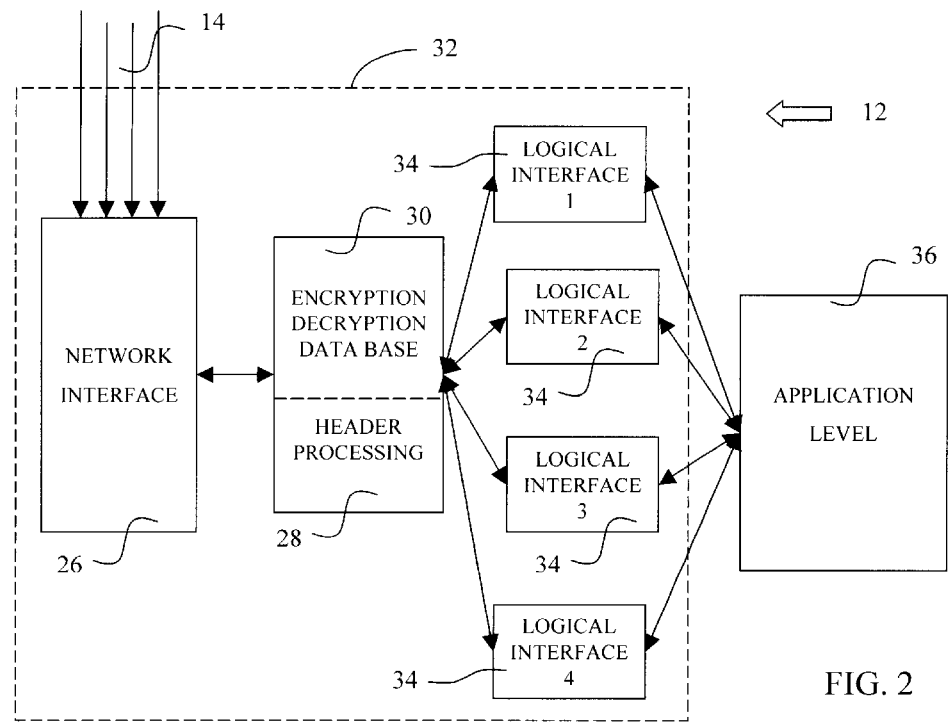
FIG. 2 is a block diagram representation of a server according to the present invention.

Referring also to FIG. 2, in a preferred embodiment of the present invention, server 12 includes a network interface 26, a header processor 28 and a data base 30 with information regarding valid keys which are necessary for encrypting and decrypting data on the network. The driver level 32 of server 12 is designed to understand the encryption scheme. During initialization, the driver software reads the encryption information contained in data base 30. It configures a logical interface 34 for each encryption key in the data base. As information is passed through driver 32, the driver directs the data to one of the logical interfaces.

Work stations 16, 18, 20 and 22 are connected by network medium 14 to server 12, but the work stations do not contain the encryption key. When a user initializes a work station, the user enters a key. This key is then used in subsequent transactions with the server.

Any application programs 36 run in server 12 deal with the data in an unencrypted form. When an application wishes to talk to a client, in this case a work station, it responds on the same logical interface that it received the data from. This allows the driver to encrypt the data in a manner necessary for that work station to understand. Each work station on the server can have its own key for an encryption algorithm or several work stations may share a key.

Figure 3:
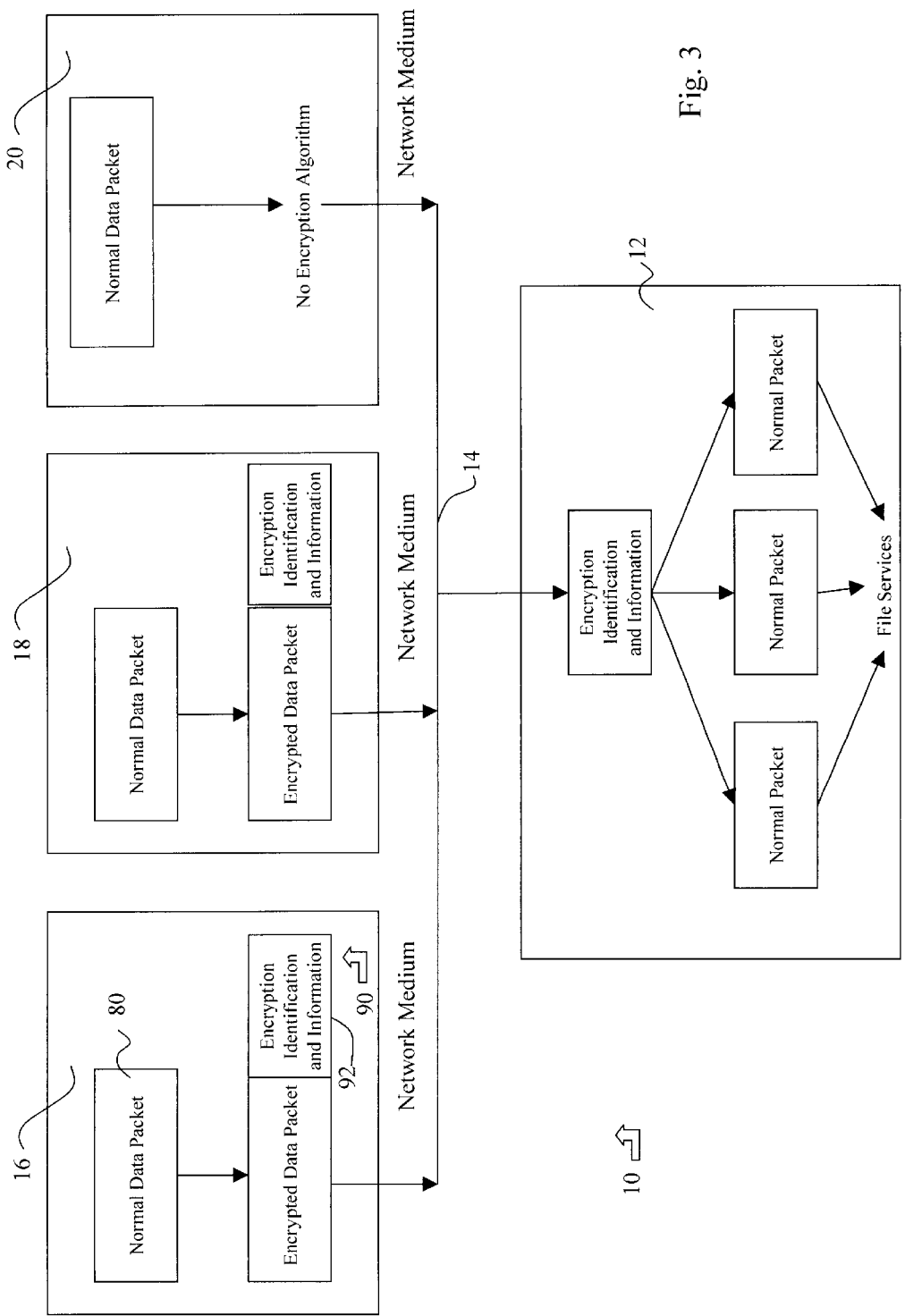
FIG. 3 is a diagrammatic representation of a local area computer network according to the present invention.
Figure 4:
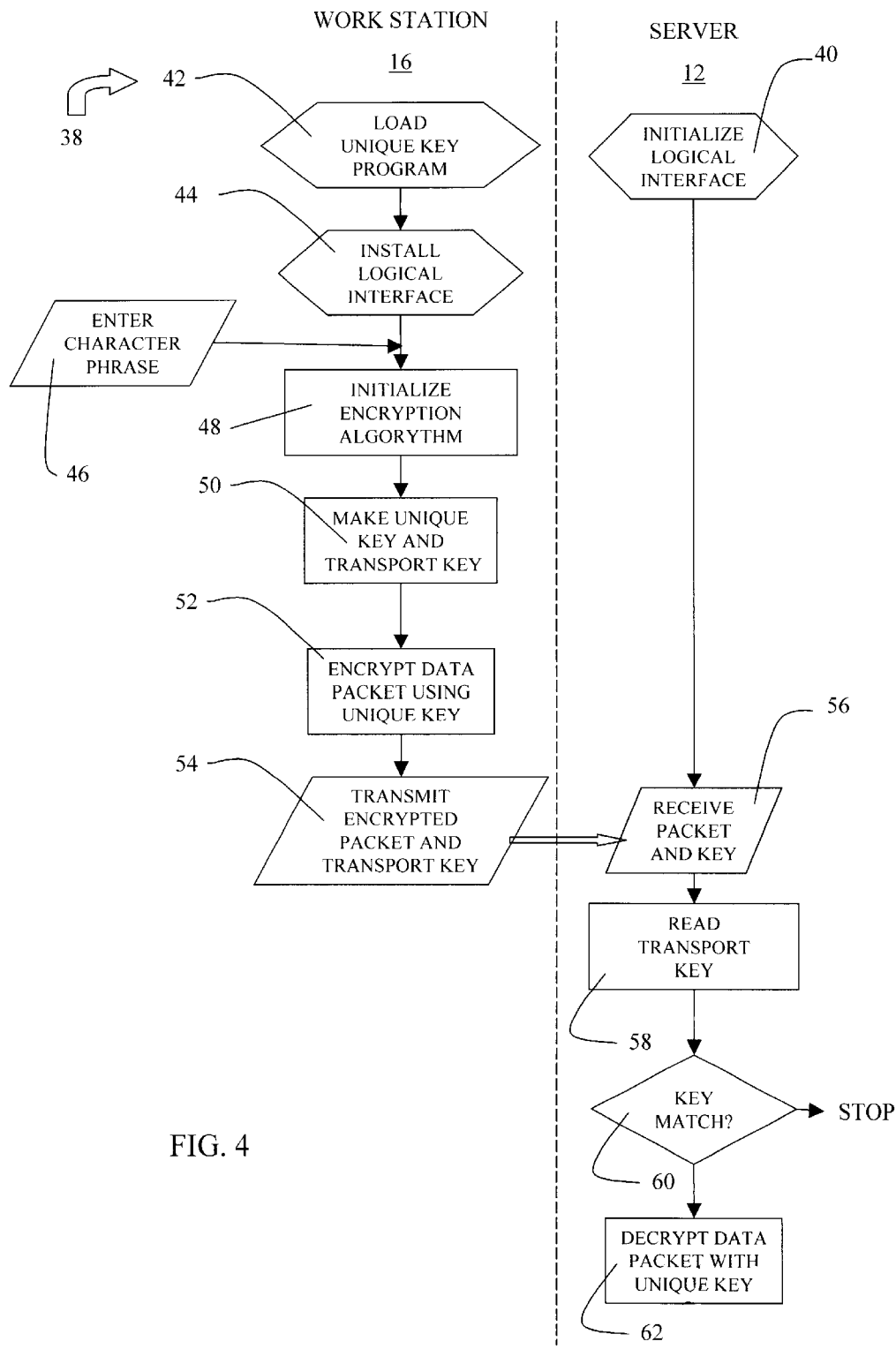
FIG. 4 is a flow diagram representation of a method for transmitting an encrypted data packet from a work station to a server according to the present invention.

Referring also to FIG. 3, FIG. 4 and FIG. 5, a method according to the present invention for secured transmission in a computer network between a work station and a server, referred to generally by reference numeral 38, includes the steps of initializing 40 a predetermined number of logical interfaces 34 in server 12, loading 42 a program that can create a unique key and a transport key from a character phrase into the work station choosing an encryption algorithm, installing 44 a software logical interface into the work station, entering 46 a predetermined character phrase into the work station, initializing 48 a key generation algorithm creating the unique key and the transport key 50 by the work station logical interface, encrypting 52 by the work station of a first data packet for transmission, transmitting 54 the encrypted first data packet including the transport key to the server from the work station, receiving 56 the encrypted first data packet by the server, reading 58 the transport key by the server, comparing 60 the transport key with a list of transport keys corresponding to server logical interfaces, and if the transport key matches with a key for a server logical interface, then decrypting 62 by the server of the encrypted first data packet using the unique key and chosen algorithm for that logical interface and sending the data to the next higher level.

The method, in one embodiment, also includes the steps 64 of choosing 66 the logical interface associated with the work station and encrypting 68 by the server of a second data packet for transmission using the chosen logical interface, encryption algorithm and key, transmitting 70 the encrypted second data packet including the transport key to the work station from the server, receiving 72 the encrypted packet of data by the work station, reading 74 the transport key by the work station, comparing 76 the transport key with the transport key of the work station, and if the transport key matches the transport key of the work station, then decrypting 78 by the work station of the encrypted second data package using the unique key and chosen encryption algorithm.

Figure 6:
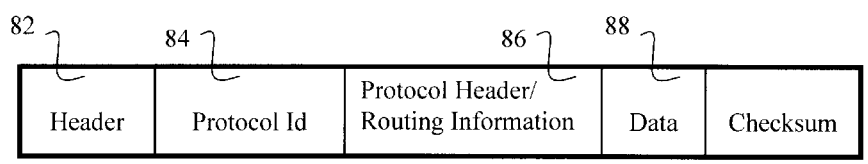
FIG. 6 is a representation of a normal information packet.

Referring now to FIG. 6, a normal packet 80 of data transmitted in a local area network or a wide area network contains certain information necessary for other devices in the network to move the packet from its source computer to a destination computer. For a packet to traverse a wide area network, the packet must pass through several other computers that will route the packet. The other computers need a certain amount of data to successfully route the packet. This information is contained at the beginning of the packet. The information is encoded in the packet header 82, protocol identifier (protocol ID) 84 and the protocol information header 86. The payload of the transmission follows this as the data 88.

Figure 7:
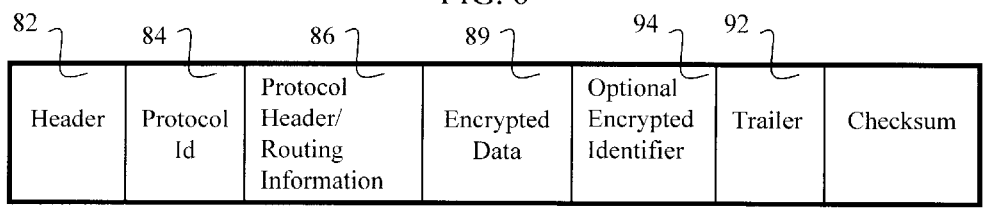
FIG. 7 is a representation of an encoded data packet according to the present invention.

Referring also to FIG. 7 where similar elements have the same reference numbers, an encoded packet according to the present invention is referred to generally by reference numeral 90. Encoded packet 90 contains encrypted data 89 corresponding to data 88. To achieve a routable packet, a minimum of the first two and, in some cases, the first three fields must be preserved. The data alone can be encrypted. To preserve the packet information, an encryption identification and information section 92 containing the transport key is appended to the packet rather than added to the beginning of the packet. This allows the packet to pass devices necessary for the delivery of the information without those devices having the ability to read the data within the packet, maintaining security. In order to successfully keep garbage data from filtering to the higher application layers, an identifier 94 can be added to the encrypted data before encryption. The identifier confirms that the packet has been successfully unencrypted by the encryption layer. The identifier is derived when the unique key and the encryption key are derived. The identifier remains known only to the computers that also understand the key. This allows the identifier to be used while maintaining the privacy of the transaction.

Transaction Work Station to Server

When a work station application wishes to send a packet to server 12, the packet is sent to the logical network card within the work station. The invention may or may not add the identifier, encrypts data in the packet using the encryption key and then adds information 92 to the packet. The information section uniquely identifies the packet as coming from this logical board. The invention also puts the transport key into the encryption identification and information section of the packet. Packet 90 is then sent across the computer network.

Server 12 receives packet 90. The invention has been install ed on the server to process this particular protocol, rather than the normal protocol stack so the packet is routed to the invention for further processing. The invention then examines the transport key. If the transport key is not in the predefined list of transport keys, the packet is discarded. If the transport key is in the list, the packet is decrypted using the encryption key within the table. If an identifier is used, the identifier is checked. If the identifier does not match, then the packet is discarded. The packet is then passed up toward the application layer (normal protocol stack) for further processing. If the packet was encrypted using the same key which the server used to decrypt the packet, the packet will be fully restored and the higher levels of software will process the data. If the packet was not encrypted using the exact key, the packet will not be discernible to the higher level software and will be eventually discarded or the encrypted identifier will not be legible and the packet will be discarded.

Transaction Server to Work Station

If server 12 has knowledge of a particular work station 16 and wishes to send data to that work station, the server will communicate to that work station on the same logical interface 34 that the server received the last message from the work station. When the packet is sent to this logical interface, the invention receives the packet. The packet is then encrypted using the encryption key and the encryption algorithm reserved for that logical interface. Information section 92 uniquely identifies the packet as coming from this logical board. The invention also puts the transport key into the information section of the packet. The packet is then sent across the computer network.

If the server wishes to communicate with a work station and the server does not know the port the work station is on, the server will usually send the message to all known logical ports. The work station, when receiving this message responds on the port designated for the work station. From that point on, the server knows on which logical card the work station exists and all further communication takes place exclusively on that card.

It can now be seen that a network or method according to the present invention is application and data independent since the entire scheme can take place at the driver level of the software. The system has several outstanding features:

1. multiple sessions employing several keys or encryption algorithms or both can take place on the same physical medium using the same interface card;
2. the key never crosses the medium in any form; an identifier derived from the key can cross the medium, but many keys can derive this identifier using the same key creation algorithm;
3. the system can be incorporated into commercially available networks and remain transparent to higher levels of the operating systems;
4. the system can be very low cost and can be implemented on existing hardware; if, however, increased security is desired, encryption hardware can be employed to generate more robust encryption schemes such as the Data Encryption Standard (DES); and
5. the key is work station independent; several work stations can use the same key; users can log on from any work station with their own key.

From the foregoing it will be seen that this invention is well adapted to attain all of the ends and objectives hereinabove set forth, together with other advantages which are inherent to the apparatus.

It will be understood that certain features and sub combinations are of utility and may be employed without reference to other features and sub combinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

What is claimed is:

1. A method for secured transmission in a computer network between a work station and a server, comprising in combination the steps of:

initializing a predetermined number of logical interfaces in the server;

installing a software logical interface into the work station;

entering a predetermined character phrase into the work station;

generating a unique key and a transport key from the character phrase;

initializing an encryption algorithm using the character phrase and the transport key;

encrypting by the work station of data and including the encrypted data in a first encoded packet for transmission from the work station to the server;

including the transport key in the first encoded packet;

transmitting the first encoded packet to the server from the work station;

receiving the first encoded packet by the server;

reading the transport key by the server;

comparing the transport key with a list of transport keys corresponding to server logical interfaces; and if the transport key matches with a key for a server logical interface, then decrypting by the server of the encrypted data in the first encoded packet using that logical interface.

2. A method according to claim 1 further comprising the steps of:

encrypting by the server using the logical interface associated with the work station of data and including the encrypted data in a second encoded packet for transmission from the server to the work station;

including the transport key in the second encoded packet;

transmitting the second encoded packet to the work station from the server;

receiving the encrypted packet of data by the work station;

reading the transport key by the work station;

comparing the transport key with the transport key of the work station; and if the transport key matches the transport key of the work station, then decrypting by the work station of the encrypted data in the second encoded packet.

3. A method according to claim 2 further comprising the steps of:

adding an identifier, which is known to both the server and the work station, to the data prior to encryption by the server for inclusion in the second encoded packet; and verifying the identifier following decryption of the encrypted data in the second encoded packet by the work station.

4. A method according to claim 1 further comprising the steps of:

adding an identifier, which is known to both the server and the work station, to the data prior to encryption by the work station for inclusion in the first encoded packet; and verifying the identifier following decryption of the encrypted data in the first encoded packet by the server.

5. A method for secured transmission between a first computer and a second computer, comprising in combination the steps of:

selecting a unique key for the first computer;

initializing an encryption algorithm using the unique key;

encrypting the unique key into a transport key by the first computer;

encrypting by the first computer of data and included the encrypted data in a first encoded packet for transmission;

including the transport key in the first encoded packet;

transmitting the first encoded packet to the second computer from the first computer;

receiving the first encoded packet by the second computer;

reading the transport key by the second computer;

comparing the transport key with a list of transport keys corresponding to logical interfaces in the second computer; and if the transport key matches with a key for a logical interface in the second computer, then decrypting by the second computer of the data in the first encoded packet using that logical interface.

6. A method according to claim 5 further comprising the steps of:

encrypting by the second computer using the logical interface associated with the first computer of data and including the encrypted data in a second encoded packet for transmission;

including the transport key in the second encoded packet;

transmitting the second encoded packet to the first computer from the second computer;

receiving the second encoded packet by the first computer;

reading the transport key by the first computer;

comparing the transport key with the transport key sent by the first computer; and if the transport key matches the transport key sent by the first computer, then decrypting by the first computer of the encrypted data in the second encoded packet.

7. A method according to claim 6 further comprising the steps of:

adding an identifier, which is known to both the first computer and the second computer, to the data prior to encryption by the second computer for inclusion in the second encoded packet; and verifying the identifier following decryption of the encrypted data of the second encoded packet by the first computer.

8. A method according to claim 5 further comprising the steps of:

adding an identifier, which is known to both the first computer and the second computer, to the data prior to encryption by the first computer for inclusion in the first encoded packet; and verifying the identifier following decryption of the encrypted data in the first encoded packet by the second computer.

9. A computer network comprising a plurality of computers functionally connected by a network medium, wherein a first computer of the plurality comprises in combination:

a unique key program;

a software logical interface;

an encryption algorithm for use by the logical interface with a unique key to encrypt data for inclusion in encoded packets for transmission or to decrypt data from received encoded packets;

a driver for receiving and transmitting encoded packets, which packets also include a transport key in order to communicate with a second computer of the plurality, wherein the transport key is logically related to the unique key used with the logical interface; wherein the second computer logically comprises in combination:

a network interface for receiving and transmitting encoded packets, which encoded packets include both the transport key and encrypted data;

a data base containing information regarding transport keys which can be used by other computers in the network;

a predetermined number of logical interfaces, one logical interface corresponding to each transport key;

a number of unique encryption algorithms, each encryption algorithm for use by any logical interface with the unique key to decrypt data from a received encoded packet or encrypt data for inclusion in an encoded packet for transmission;

a program routine for comparing the transport key received from the first computer with a list of transport keys corresponding to the logical interfaces in the second computer and if the transport key matches with a key for a logical interface, then selecting that logical interface for decrypting of data from a received encoded packet.

10. A method for secured transmissions of data between a plurality of systems using a predetermined plurality of protection algorithms and a plurality of transport keys corresponding to the plurality of algorithms, comprising in combination the steps of:

selecting by a first system from the plurality of systems of an algorithm from the plurality of protection algorithms;

processing the data using the selected protection algorithm;

selecting a transport key which indicates which protection algorithm is used wherein the transport key is logically related to a unique key used with an algorithm;

transmitting the processed data and the selected transport key to at least one system of the plurality of systems;

receiving the transmitted data and the selected transport key by the at least one system;

reading the selected transport key by the at least one system;

comparing the selected transport key with a list of transport keys from the plurality of transport keys which are accessible to the at least one system; and if the selected transport key matches with a transport key from the list, then restoring the data by the at least one system using the reverse of the selected algorithm.

11. A system in communication with a plurality of systems, comprising in combination:

a predetermined plurality of protection algorithms;

a plurality of transport keys corresponding to the plurality of algorithms wherein a transport key is logically related to a unique key used with an algorithm;

means for selecting an algorithm from the plurality of protection algorithms;

means for processing the data using the selected protection algorithm;

means for selecting a transport key which indicates which protection algorithm is used; and means for transmitting the processed data and the selected transport key to at least one system of the plurality of systems, wherein the at least one system can restore the data if it has access to the selected transport key and the selected algorithm.

12. A method for secured transmissions among a plurality of computers through the same physical interface, comprising in combination the steps of:

selecting a unique key and a transport key for each computer transmission which is to be secure;

encrypting data using the unique key and including the encrypted data in an encoded packet for transmission;

including the transport key in the encoded packet;

transmitting the encoded packet over the physical interface to each computer which is intended to receive the secured transmission;

receiving the encoded packet from the physical interface by each intended receiving computer;

reading the transport key by each intended receiving computer;

comparing the transport key with a list of transport keys corresponding to logical interfaces in each intended receiving computer; and if the transport key matches with a key for a logical interface; wherein the transport key is logically related to the unique key used with the logical interface in an intended receiving computer, then decrypting by that computer of the encrypted data in the encoded packet using that logical interface.

13. A method according to claim 12 wherein the step of including the transport key in the encoded packet further comprises the step of including the transport key as part of a header at the beginning of the encoded packet, wherein the transport key enables the plurality of computers to distinguish between simultaneous sessions involving some of the same computers.

14. A method according to claim 12 wherein the step of including the transport key in the encoded packet further comprises the step of including the transport key as part of a trailer at the end of the encoded packet, wherein the transport key enables the plurality of computers to distinguish between simultaneous sessions involving some of the same computers.

15. A method according to claim 12 further comprising the step of including unencrypted information necessary to describe the routing from the transmitted computer to each intended receiving computer in the encoded packet prior to transmission.

16. A computer for use in a computer network having a plurality of computers functionally connected by a network medium, comprising in combination:

a network interface for receiving and transmitting encoded packets which include encrypted data;

a data base containing information regarding transport keys which can be used by other computers in the network;

a predetermined number of logical interfaces, one logical interface corresponding to each transport key;

a number of unique encryption algorithms, each encryption algorithm for use by any logical interface with a unique key associated with each logical interface to decrypt data from a received encoded packet or encrypt data for inclusion in an encoded packet for transmission, wherein the transport key is logically related to the unique key used with a logical interface;

a program routine for comparing the transport key received from another computer of the plurality, with a list of transport keys corresponding to the logical interfaces in the computer and if the transport key matches with a key for a logical interface, then selecting that logical interface for decrypting of data from a received encoded packet.

* * * * *